United States Patent [19]

Rowland et al.

[11] Patent Number: 4,506,594

[45] Date of Patent: Mar. 26, 1985

[54] FLUID FLOW CONTROL APPARATUS AND METHOD

[75] Inventors: Charles M. Rowland, Phoenix; James A. Denneny, Jr., Scottsdale, both of Ariz.

[73] Assignee: The Garrett Corporation, Los Angeles, Calif.

[21] Appl. No.: 352,392

[22] Filed: Feb. 25, 1982

[51] Int. Cl.² ............................................. B64D 13/00
[52] U.S. Cl. .................................. 98/1.5; 137/625.64; 137/625.44; 73/861.64
[58] Field of Search ...................... 98/1.5; 137/625.24, 137/625.64; 73/861.63, 861.64

[56] References Cited

U.S. PATENT DOCUMENTS

| | | |
|---|---|---|
| 2,424,491 | 7/1947 | Morris . |
| 2,450,881 | 10/1948 | Cooper et al. . |
| 2,463,489 | 3/1949 | Kemper . |
| 2,473,776 | 6/1949 | Baak . |
| 2,491,461 | 12/1949 | Wood . |
| 2,491,462 | 12/1949 | Wood . |
| 2,556,159 | 6/1951 | Arthur . |
| 2,562,918 | 8/1951 | Hynes . |
| 2,618,125 | 11/1952 | Fischer . |
| 2,692,545 | 10/1954 | Arthur et al. . |
| 2,693,088 | 11/1954 | Green . |
| 2,723,615 | 11/1955 | Morris et al. . |
| 2,734,443 | 2/1956 | Wood . |
| 2,900,890 | 8/1959 | Fischer et al. . |
| 2,922,431 | 1/1960 | Jensen ............................... 98/1.5 X |
| 2,929,225 | 3/1960 | Cholvin et al. . |
| 3,177,676 | 4/1965 | Abrahams . |
| 3,177,679 | 4/1965 | Quick et al. . |
| 3,221,511 | 12/1965 | Garrett . |
| 3,326,109 | 6/1967 | Markham . |
| 3,441,045 | 4/1969 | Malone . |
| 3,712,339 | 1/1973 | Bartholomaus et al. ... 137/625.64 X |
| 4,149,564 | 4/1979 | Higby et al. ................. 137/625.4 X |

Primary Examiner—William E. Wayner
Assistant Examiner—J. Sollecito
Attorney, Agent, or Firm—Terry L. Miller; Albert J. Miller

[57] ABSTRACT

A fluid flow control apparatus and method wherein a pair of output signals from a pair of fluid flow sensors having differing characteristics are blended according to a preselected law to produce a third signal controlling fluid flow.

24 Claims, 4 Drawing Figures

FLUID FLOW CONTROL APPARATUS AND METHOD

BACKGROUND AND SUMMARY OF THE INVENTION

This invention relates to a fluid flow control apparatus and method. More particularly, this invention relates to apparatus and method for controlling the rate of fluid flow from a source of pressurized fluid such as a compressor of a turbine engine to an enclosure such as an aircraft cabin.

Modern aircraft having a turbine engine such as a turboprop or turbofan engine conventionally utilize air bled from the compressor of the engine to pressurize the aircraft cabin and to provide a ventilating flow of fresh air through the cabin. The ventilating flow requirements of the aircraft cabin vary directly with the number of passengers therein. Consequently, the cabin pressurizing and ventilating system must provide for a bleed air flow corresponding to the maximum number of passengers which the cabin will accommodate. However, bleeding air from the compressor of a turbine engine has a detrimental effect upon the fuel efficiency of the engine. Consequently, when the cabin is not fully occupied, a reduction in the rate of ventilating airflow is desirable in order to preserve engine fuel efficiency.

To this end, conventional aircraft pressurizing and ventilating systems have provided for step-wise variation of the ventilating flow rate. Thus, a ventilating air flow rate approximating the percentage of cabin occupancy may be arrived at by operating the system on one of the steps between zero and 100 percent flow rate. For example, one oonventional system provides steps of zero, 68 percent, and 100 percent flow rate. Obviously, such a step-wise variation of air flow rate allows only a very rough approximation of the cabin occupancy percentage, particularly when only a few steps are provided. Thus, an excessive ventilating air flow rate is usually provided at the expense of decreased engine fuel efficiency.

In view of the recognized deficiencies of conventional aircraft cabin pressurizing and ventilating systems, it is an object for this invention to provide an apparatus and method for controlling the rate of air flow to an aircraft cabin which allows infinite or step-less variation of the air flow rate over a selected part of the operating range of the apparatus.

Another object for this invention is to provide a fluid flow control apparatus and method wherein a pair of fluid flow sensors having differing sensing characterisitics are exposed to fluid flowing in a duct to produce a pair of signals analogous to the fluid flow and differing from one another; and blending the pair of signals to produce a third signal controlling the fluid flow rate.

Yet another object is to provide a fluid flow control apparatus and method wherein a pair of signals are supplied to a valve device blending the pair of signals to produce a third signal according to an operator input to an actuator of the valve device.

In summary, this invention provides a fluid flow control apparatus and method wherein a duct communicates pressurized air form a source thereof to an enclosure. A pair of fluid flow sensors having differing sensing characteristics are exposed to fluid flowing in the duct to produce a pair of signals analogous to the fluid flow rate in the duct and differing from one another. The pair of signals are blended according to an operator input to produce a third signal. A valve device is disposed in the duct to open and close communication therethrough in response to the third signal so that the fluid flow rate into the enclosure is scheduled according to the operator input.

Further objects and advantages of the invention will be apparent in light of the following detailed description of a preferred embodiment of the invention.

DETAILED DESCRIPTION OF THE PREFERRED EMBODIMENT

Figure 1:
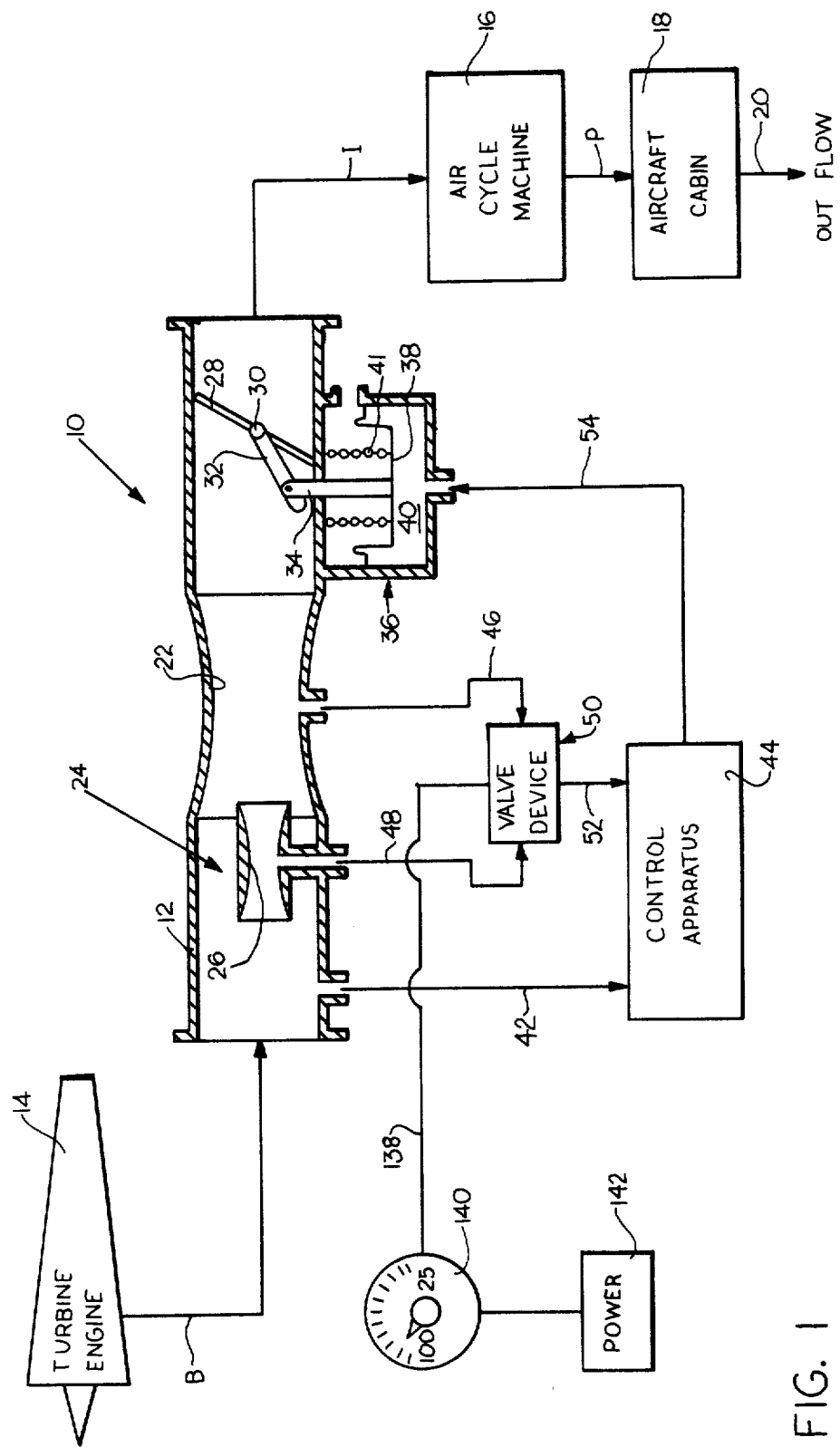
FIG. 1 schematically illustrates a preferred embodiment of the invention.

FIG. 1 illustrates an aircraft cabin pressurizing and ventilating system 10 which includes a duct 12 receiving pressurized air at its left end from a source thereof. The air pressure source 14 is illustrated as a turbine engine having a compressor (not shown) from which pressurized air is bled to the system 10, as illustrated by arrow B. However, the source 14 may alternatively be any source of pressurized air. For example, the source 14 may be a blower or supercharger driven by a propulsion engine of an aircraft or an auxiliary power unit having a compressor for supplying pressurized air.

Air flowing in the duct 12 exits at the right end thereof to an air-cycle air conditioning machine 16, as illustrated by the arrow I. The air conditioning machine 16 may cool the air received from duct 12 and perform other conditioning functions such as filtering, humidifying or dehumidifying, and removal of noxious vapors before passing the air to a passenger cabin 18, as illustrated by arrow P. From the aircraft cabin 18, vitiated air 20 flows to the atmosphere.

The duct 12 contracts to define a venturi throat 22. Upstream of the venturi throat 22, a member 24 defining a booster venturi 26 is disposed in the duct 12. Downstream of the venturi throat 22 a valve device 28 of the butterfly type is carried by a pivotal transverse shaft 30. A lever member 32 drivingly couples with the shaft 30 and with a link 34 of a pneumatic actuator 36. The actuator 36 includes a movable diaphram 38 bounding a chamber 40 and drivingly coupling with the link 34. A spring 41 yieldably biases the diaphram 38 in a direction contracting the chamber 40 and moving the valve member 28 to an angular position closing the duct 12.

A conduit 42 opens to the interior of duct 12 upstream of the member 24 defining the booster venturi 26. Thus, the conduit 42 receives therein static air pressure from the duct 42. Conduit 42 leads to a control apparatus generally referenced with the numeral 44, the structure and function of which is to be more fully explained hereinafter. Similarly, a pair of conduits 46 and 48 open respectively to the venturi throat 22 and to the booster venturi 26. The pair of conduits 46 and 48 lead to an electromagnetically controlled valve device 50, the structure and function of which is also to be explained hereinafter. A conduit 52 leads from the valve device 50 to the control apparatus 44. A control conduit 54 leads from the control apparatus 44 to the chamber 40 of the pneumatic actuator 36.

Figure 2:
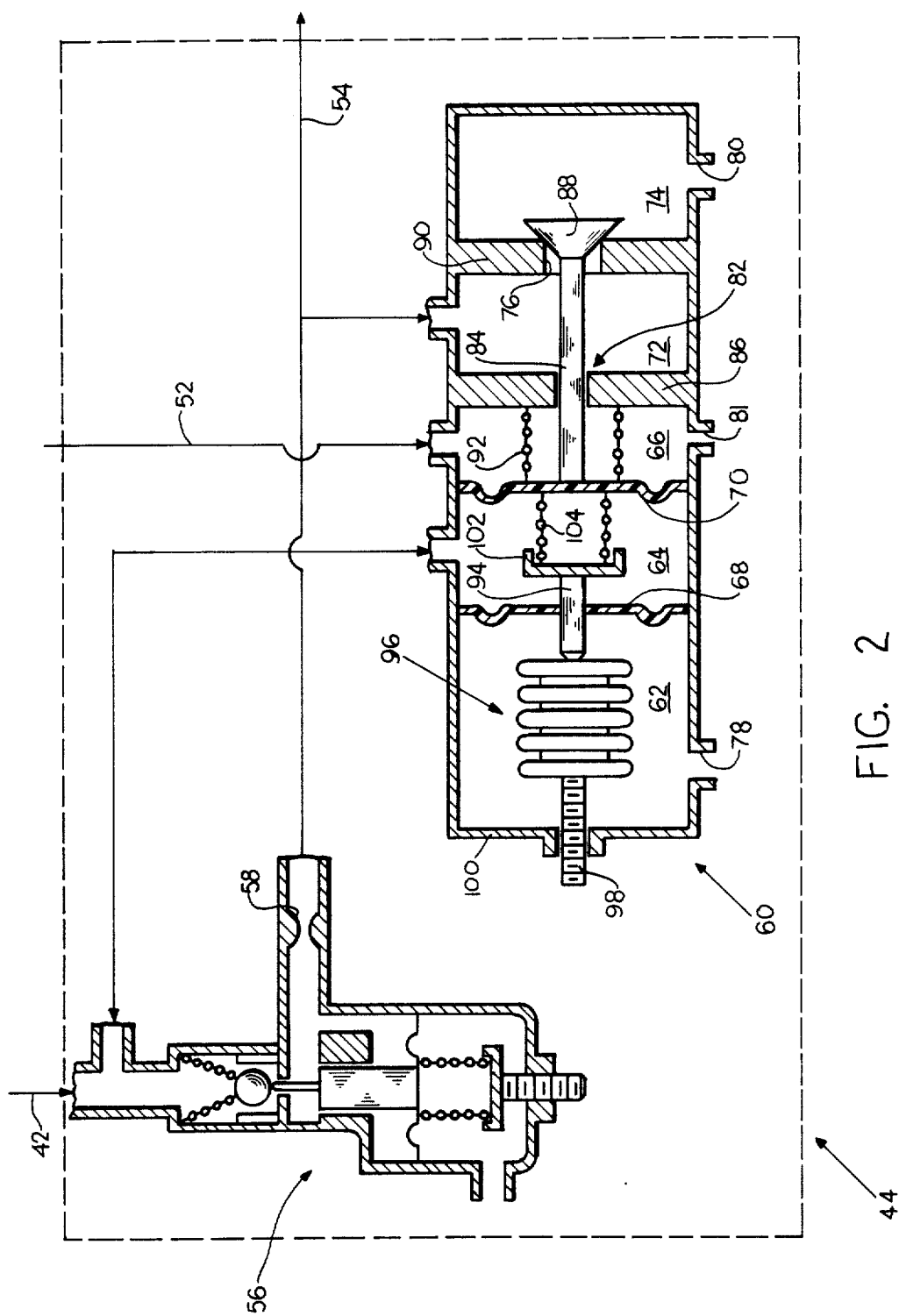
FIG. 2 schematically illustrates a control apparatus of the preferred embodiment illustrated in FIG. 1.

FIG. 2 illustrates that the control apparatus 44 includes a conventional pressure regulator 56 the inlet of which is connected to the conduit 42 and the outlet of which is connected to the chamber 40 via a flow restricting orifice 58 and the conduit 54. The apparatus 44 also includes an altitude-responsive flow scheduling valve 60. The valve 60 includes three chambers 62, 64 and 66 which are separated by a pair of flexible diaphrams 68 and 70. Further, the valve 60 includes a pair of chambers 72 and 74 which are interconnected by a passageway 76. The chambers 62 and 74 communicates with the atmosphere via respective vent apertures 78 and 80. Chamber 64 communicates with the conduit 42 while the chamber 66 communicates with conduit 52. Chamber 66 also communicates with the atmosphere via a restrictive orifice 81. Chamber 72 communicates with the control conduit 54.

The diaphram 70 drivingly couples with a stem valve 82 having a stem section 84 sealingly and movingly extending through a separating wall 86. The stem section 84 also extends through the chamber 72 and passageway 76 to a valve section 88 disposed in the chamber 74. The valve section 88 of stem valve 82 is sealingly engageable with a wall 90 defining the passageway 76. A coil compression spring 92 extends between the wall 86 and the diaphram 70 to yieldably bias the latter leftwardly, viewing FIG. 2. Thus, the spring 92 biases the valve section 88 into sealing engagement with the wall 90.

Similarly, the diaphram 68 drivingly couples with a push rod 94 which at its left end engages an expansible aneroid capsule 96 disposed in the chamber 62. The aneroid capsule 96 is carried by a stem 98 threadably engaging a wall 100 of the valve 60 so that the position of the capsule 96 is adjustable by rotation of the stem 98. At its right end, viewing FIG. 2, the push rod 94 carries a spring seat 102. A coiled compression spring 104 extends between the spring seat 102 and the diaphram 70 to bias the latter rightwardly in opposition to the spring 92. However, the spring rate or preload of spring 92 is greater than that of spring 104 so that the net spring force on diaphram 70 is leftwardly directed to seat the valve section 88 against wall 90.

Figure 3:
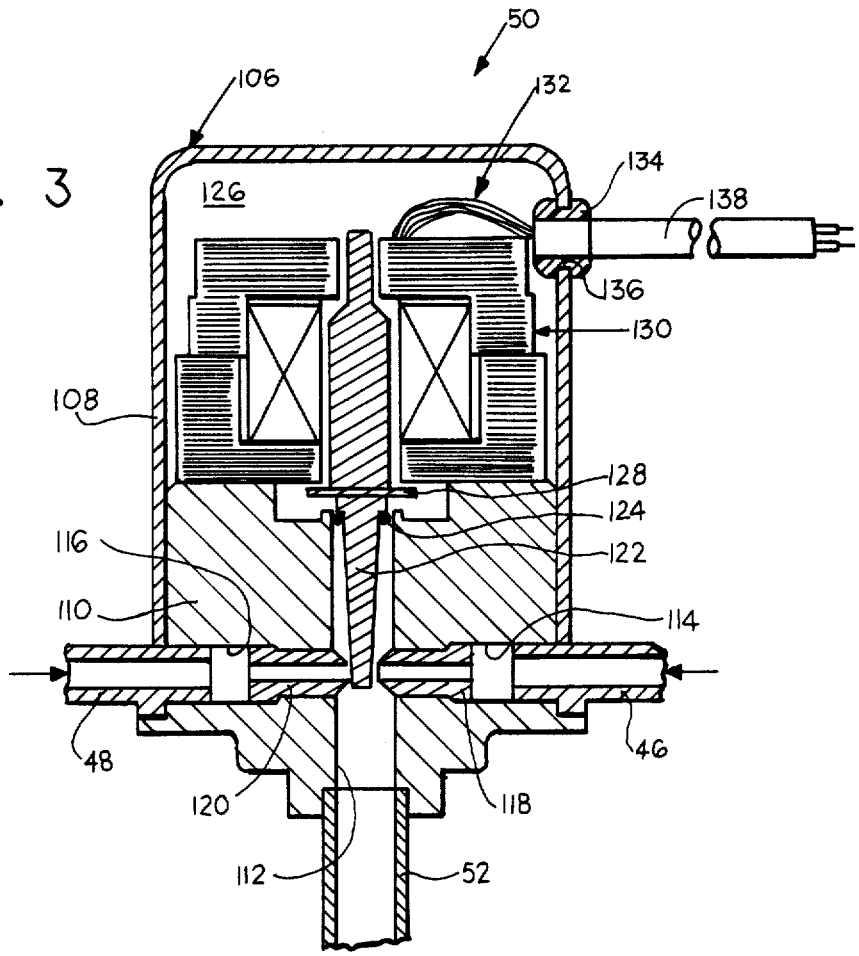
FIG. 3 illustrates a cross-sectional view of an electromagnetically controlled valve device which is also illustrated schematically in FIG. 1.

FIG. 3 illustrates that the electromagnetically controlled valve device 50 includes a housing 106 composed of a cup-shaped member 108 and a plug member 110 closing the open end of the member 108. The plug member 110 defines a bore 112 connecting at its lower end to the control conduit 54. A pair of opposed bores 114 and 116 extend radially inwardly in the plug member 110 to open on the bore 112 in respective nozzle elements 118 and 120. The bores 114 and 116 connect at their outer ends to the conduits 46 and 48 respectively. A magnetically responsive valve member 122 is movably disposed in the bore 112. An annular seal member 124 movably cooperates with the plug member 110 and with member 122 to sealingly isolate the bore 112 from a chamber 126 defined in the housing 106. A torsion spring member 128 (only a portion of which is visible in FIG. 3) is carried by the plug member 110 in the chamber 126 and carries the member 122 to define a pivot axis for the latter while biasing the lower end thereof into engagement with the nozzle element 120. An electromagnet assembly 130 is disposed in the chamber 126 in association with the upper end of the member 122. Electrical leads 132 extend from the assembly 130 through a grommet 134 carried in an aperture 136 defined by the cup-shaped member 108. The electrical leads 132 extend into an electrical cable 138. The electrical cable 138 connects to a variable potentiometer 140 receiving electrical power from a source 142 thereof, viewing FIG. 1.

Having observed the structure of system 10, attention may now be given to its operation. When the turbine engine 14 is operating, pressurized air is bled therefrom into the left end of duct 12, viewing FIG. 1. Pressurized air communicates via conduit 42 to the pressure regulator 56 which establishes a predetermined pressure in the conduit 54 and chamber 40 to open the valve member 28 in opposition to spring 41. As soon as the valve member 28 opens, a flow of air is established through the duct 12 and into the cabin 18 via the air cycle machine 16. The flow of air in duct 12 causes comparatively low air pressures to be developed in the venturi throat 22 and in the booster venturi 28. The air pressures in the venturies 22 and 28 are analogous to the respective air velocities therethrough and, therefore, are analogous to the mass air flow rate in the duct 12. However, because the venturies 22 and 26 differ in size, the reduced air pressures developed therein are different analogs of the air flow in duct 12 and differ from one another.

Figure 4:
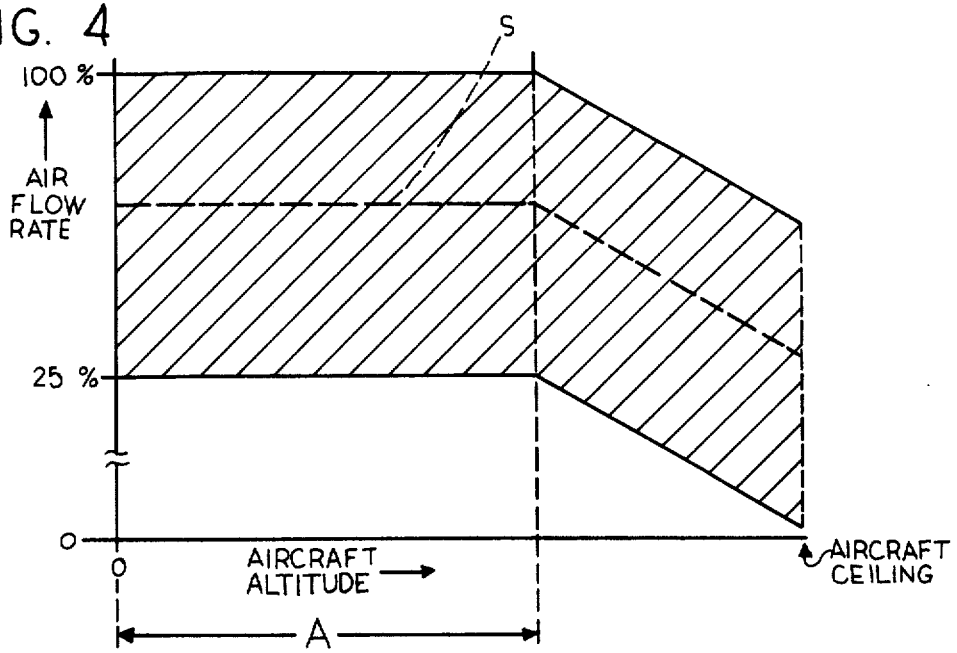
FIG. 4 illustrates a graph of ventilating air flow rate versus aircraft altitude.

The differing air pressure signals from venturies 22 and 26 are communicated to valve device 50 via conduits 46 and 48 respectively. Viewing FIG. 3, it will be seen that the valve member 122 obstructs the nozzle member 120 associated with conduit 48 while the nozzle member 118 associated with conduit 46 is substantially unobstructed. Therefore, only the air pressure signal from venturi 22 is communicated by valve device 50 via conduit 52 to chamber 66 of flow scheduling valve 60. The size of the retrictive orifice 81, viewing FIG. 2, is selected to allow an air flow through the valve device 50 while maintaining an air pressure in the chamber 66 which varies according to the air pressure signal supplied thereto. Thus, the diaphram 70 is biased leftwardly by spring 92 and by air pressure in chamber 66. However, diaphram 70 is biased rightwardly by spring 104 and by static air pressure in chamber 64 which exceeds the air pressure in chamber 66. A force balance is established on diaphram 70, moving the stem valve 82 rightwardly to unseat valve section 88 and bleed air pressure from the conduit 54 downstream of the orifice 58. Thus, the air pressure acting upon diaphram 38 of actuator 36, viewing FIG. 1, is reduced so that the acutator 36 moves the valve member 28 toward a closed position. Consequently, the air flow rate through duct 12 is limited to 100 percent of a design air flow rate. The physical parameters of the system 10 are selected so that the 100 percent design air flow rate is maintained through duct 12 througout a selected aircraft altitude range 'A' as is illustrated by FIG. 4.

When the aircraft altitude exceeds the upper limit of the altitude range 'A', the aneroid capsule 96 expands to move the pushrod 94 and spring seat 102 rightwardly increasing the preload on spring 104, viewing FIG. 2. Thus, the force balance of diaphram 70 is shifted with increasing altitude above the range 'A' to decrease the air flow rate as the aircraft altitude increases toward the altitude ceiling.

In order to reduce the air flow through duct 12 and preserve engine fuel efficiency when less than the maximum number of passengers occupy the cabin 18, the potentiometer 140 may be set to supply current to the electromagnet 130 of valve device 50. When the electromagnet 130 is energized, it magnetically applies a torque to the armature 122 pivoting the latter counter-clockwise in opposition to the spring member 128, viewing FIG. 3, according to the voltage level supplied thereto. Examination of FIG. 3 will reveal that as the member 122 is pivoted counter-clockwise, the nozzle element 118 is progressively obstructed while the nozzle element 120 is progressively unobstructed or opened to the same degree. Thus, the air pressure signal appearing in the conduit 54 becomes a blend of the air pressure signals from venturies 22 and 26 according to the voltage applied to electromagnet 130. When full rated voltage is applied to the valve device 50, the member 122 moves against the nozzle element 118 so that the air pressure signal to scheduling valve 60 is that of booster venturi 26 alone.

Because the booster venturi 26 is smaller than the venturi 22, the booster venturi produces the lower air pressure in response to air flow through the duct 12. Thus, when full rated voltage is applied to the valve device 50, the booster venturi 26 alone communicates with chamber 66 of the scheduling valve 60 and the force balance of diaphram 70 is shifted to maintain a predetermined lower air flow rate through duct 12. For example, the air flow rate may be reduced to 25 percent of the design 100 percent airflow rate, viewing FIG. 4. When the voltage applied to valve device 50 is between zero and full rated voltage, the air pressure signals from venturies 22 and 26 are blended and the air flow rate in duct 12 is maintained proportionately between the 100 percent level and the predetermined lower level. Accordingly, the potentiometer 140 carries a scale thereon which is calibrated in passenger cabin occupancy level between 100 percent and 25 percent according to the preferred embodiment of the invention. Thus, the ventilating air flow to the passenger cabin 18 may be exactly matched to cabin occupancy for any level of occupancy from 100 percent to 25 percent in order to preserve engine fuel efficiency. In other words, the system 10 may be operated anywhere within the shaded area of FIG. 4 by an appropriate adjustment of potentiometer 140.

Examination of FIG. 4 will reveal that operation of the system 10 within the shaded area of FIG. 4 has no effect upon the reduction of ventilating air flow with increasing altitude above the range 'A'. In other words, the altitude droop of the ventilating system is the same regardless of where the system is operated within the shaded range, as is illustrated by the dashed line S.

In light of the above, it will be apparent that this invention provides both a method and apparatus for controlling a fluid flow rate. While this invention has been described with reference to a preferred embodiment thereof, such reference should not be construed as a limitation upon the invention. The invention is intended to be limited only by the spirit and scope of the appended claims which alone define the invention.

We claim:

1. A flow control for admitting air from an air pressure source to a cabin at a controlled rate comprising: a duct through which a flow of said air is conducted from said source to said cabin, first and second flow sensing means for sensing said flow of air through said duct to produce respective first and second signals analogous to said air flow, said first and said second flow sensing means producing said first and said second signals as differing analogs of said flow, means for blending said first and said second signals in response to an operator input to produce a third signal, and valve means opening and closing said duct in response to said third signal.

2. The invention of claim 1 wherein said first and said second flow sensing means comprise respective first and second venturi exposed to said air flow and differing in size from one another.

3. The invention of claim 2 wherein said duct constricts to define one of said first and said second venturi.

4. The invention of claim 2 wherein one of said first and said second venturi are disposed within said duct.

5. The invention of claim 2 wherein said first and said second signals comprise respective air pressures generated by said first and said second venturi.

6. The method of controlling communication of pressurized air from a source thereof such as a compressor of a combustion turbine engine into an enclousre such as an aircraft cabin comprising the steps of:
    forming a duct communicating said air pressure source to said enclosure;
    disposing a valve device in said duct to open and close said communication therethrough in respective positions of said valve device;
    exposing a pair of air flow sensors to air flowing in said duct, said pair of air flow sensors having respective characteristics differing from one another to produce a pair of signals differing from one another;
    blending said pair of signals according to an operator-selected law to produce a third signal; and
    coupling an actuator with said valve device to drive the latter between said open and said closed positions in response to said third signal.

7. The method of claim 6 wherein said blending step includes communicating said pair of signals to a device blending said pair of signals according to the level of a fourth signal applied thereto, said fourth signal level establishing said law; and providing operator-operable means for supplying said fourth signal.

8. An aircraft cabin pressurization system comprising an air pressure source;
    means for communicating a flow of pressurized air from said source to said aircraft cabin;
    means for producing a first signal analogous to the rate of said air flow;
    means for producing a second signal analogous to the rate of said air flow and differing from said first signal;
    means for blending said first and said second signals according to an operator-selected rule to produce a third signal; and
    means for controlling said air flow rate according to said third signal.

9. The invention of claim 8 wherein said means for producing said first and said second signals comprise respective venturies which differ in size and which are exposed to said air flow, said first and said second venturies producing respective fluid pressure signals.

10. The invention of claim 8 wherein said means for controlling said air flow rate includes a scheduling valve receiving pressurized air from said source thereof, said scheduling valve also receiving said third signal and including a valve element movable to produce a control pressure signal according to the relative pressure levels of said air pressure source and said third signal.

11. The invention of claim 10 wherein said controlling means further includes a valve member movable to open and close communication of pressurized air through said communicating means in response to said control pressure signal.

12. An aircraft cabin pressurization system comprising an air pressure source;
means for communicating a flow of pressurized air from said source to said aircraft cabin;
means for producing a first signal analogous to the rate of said air flow;
means for producing a second signal analogous to the rate of said air flow and differing from said first signal;
means for blending said first and said second signals according to an operator-selected rule to produce a third signal;
means for controlling said air flow rate according to said third signal;
said means for producing said first and second signals comprising respective venturies which differ in size and which are exposed to said air flow, said first and said second venturies producing respective fluid pressure signals; and
said means for blending said first and said second signals comprising a valve device having a pair of nozzle elements each one of which receives one of said first and said second signals, said valve device further including a valve member movable to open and close at least one of said pair of nozzle elements.

13. The invention of claim 12 wherein said valve member is movable to open and close both of said pair of nozzle elements, said valve member closing one of said pair of nozzle elements while opening the other of said pair of nozzle elements.

14. The invention of claim 13 wherein said operator-selected rule comprises an electrical signal.

15. The invention of claim 14 wherein said valve device further includes an electromagnetic apparatus moving said valve member in response to said operator-selected rule.

16. The method of controlling the flow rate of pressurizing air to an aircraft cabin comprising the steps of:
exposing a first air flow sensor to said pressurizing air flow to generate a first signal analogous thereto;
exposing a second air flow sensor to said pressurizing air flow to generate a second signal analogous thereto and differing from said first signal;
combining said first and said second signals according to a predetermined rule to produce a third signal; and
using said third signal to control the rate of said pressurizing air flow.

17. The method of claim 16 wherein said step of exposing said first sensor to said air flow includes the steps of forming a first venturi member and flowing all of said air flow through said first venturi member.

18. The method of claim 17 wherein said step of exposing said second sensor to said air flow includes the steps of forming a second venturi member which is smaller than said first venturi member, and flowing a portion of said air flow through said second venturi member.

19. The method of claim 18 further including the step of sequentially flowing said portion of said air flow through said first venturi member and through said second venturi member.

20. The method of claim 18 including the step of using said first and said second venturi members to generate respective depressed air pressure levels in response to said air flow, and using said respective depressed air pressure levels as said first and said second signals.

21. The method of controlling the flow rate of pressurizing air to an aircraft cabin comprising the steps of:
exposing a first air flow sensor to said pressurizing air flow to generate a first signal analogous thereto;
exposing a second air flow sensor to said pressurizing air flow to generate a second signal analogous thereto and differing from said first signal;
combining said first and said second signals according to a predetermined rule to produce a third signal;
using said third signal to control the rate of said pressurizing air flow;
said step of exposing said first sensor to said air flow includes the steps of forming a first venturi member and flowing all of said air flow through said first venturi member;
said step of exposing said second sensor to said air flow includes the steps of forming a second venturi member which is smaller than said first venturi member, and flowing a portion of said air flow through said second venturi member;
using said first and said second venturi members to generate respective depressed air pressure levels in response to said air flow, and using said respective depressed air pressure levels as said first and said second signals; and
said step of combining said first and said second signals includes the steps of flowing pressurized air from said first venturi member at said first depressed air pressure level into a chamber, flowing pressurized air from said second venturi member at said second depressed air pressure level into said chamber, and selectively interrupting the flow of said first and said second air pressure levels into said chamber according to said predetermined rule, said air pressure level in said chamber comprising said third signal.

22. The method of claim 21 wherein said step of using said third signal to control the rate of said pressurizing air flow includes the steps of disposing a valve element in said flow of pressurizing air to open and close said flow of air according to the position of said valve element, yieldably biasing said valve element to a position closing said flow of air, and using said third signal air pressure level to oppose said yieldable bias and move said valve element to a position opening said air flow.

23. A flow control for admitting air from an air pressure source to a cabin at a controlled rate comprising: a duct through which a flow of said air is conducted from said source to said cabin, first and second flow sensing means for sensing said flow of air through said duct to produce respective first and second signals analogous to said air flow, said first and said second flow sensing means producing said first and said second signals as differing analogs of said flow, means for blending said first and said second signals in response to an operator input to produce a third signal, and valve means opening and closing said duct in response to said third signal, said first and said second flow sensing means comprising respective first and second venturi exposed to said air flow and differing in size from one another, said first and said second signals comprising respective air pressures generated by said first and said second venturi, said means for blending said first and said second air pressure signals including a valve device receiving said signals, and said valve device including a valve element moving between a first position wherein only said first signal is allowed to pass while said second signal is stopped and a second position wherein only said second signal is allowed to pass while said first signal is stopped, said valve element when intermediate said first and second positions allowing portions of said first and second signals to pass in proportion to the position of said valve element, and said portions of said signals passing said valve element forming said third signal.

24. A flow control for admitting air from an air pressure source to a cabin at a conrolled rate comprising: a duct through which a flow of said air is conducted from said source to said cabin, first and second flow sensing means for sensing said flow of air through said duct to produce respective first and second signals analogous to said air flow, said first and said second flow sensing means producing said first and said second signals a differing analogs of said flow, means for blending said first and said second signals in response to an operator input to produce a third signal, and valve means opening and closing said duct in response to said third signal, said valve means comprising a butterfly type valve element pivotally disposed in said duct and moving between open and closed angular positions to respectively open and close said duct, said valve means further including a pneumatic actuator moving said butterfly type valve element between said open and closed positions in response to said third signal.

* * * * *